(12) United States Patent
Wang

(10) Patent No.: US 12,379,208 B2
(45) Date of Patent: Aug. 5, 2025

(54) OPTICAL CAPACITY MEASUREMENT DEVICE AND CONTAINER USING THE SAME

(71) Applicant: PixArt Imaging Inc., Hsin-Chu County (TW)

(72) Inventor: Guo-Zhen Wang, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 1065 days.

(21) Appl. No.: 17/368,363

(22) Filed: Jul. 6, 2021

(65) Prior Publication Data

US 2021/0333094 A1    Oct. 28, 2021

Related U.S. Application Data

(63) Continuation-in-part of application No. 16/601,648, filed on Oct. 15, 2019, now Pat. No. 11,221,207, which is a continuation of application No. 14/731,713, filed on Jun. 5, 2015, now Pat. No. 10,488,181.

(30) Foreign Application Priority Data

Nov. 4, 2014   (TW) ................ 103138317

(51) Int. Cl.
| | | |
|---|---|---|
| *B65F 1/16* | (2006.01) | |
| *G01B 11/14* | (2006.01) | |
| *G01B 11/25* | (2006.01) | |
| *G06V 10/141* | (2022.01) | |
| *G06V 20/10* | (2022.01) | |
| *H04N 23/71* | (2023.01) | |
| *H04N 23/73* | (2023.01) | |
| *H04N 23/741* | (2023.01) | |

(52) U.S. Cl.
CPC .............. *G01B 11/25* (2013.01); *G01B 11/14* (2013.01); *G06V 10/141* (2022.01); *G06V 20/10* (2022.01); *H04N 23/71* (2023.01); *H04N 23/73* (2023.01); *H04N 23/741* (2023.01)

(58) Field of Classification Search
CPC ...... G01B 11/25; G01B 11/14; G06V 10/141; G06V 20/10; H04N 23/71; H04N 23/73; H04N 23/741; H04N 25/589
See application file for complete search history.

(56) References Cited

U.S. PATENT DOCUMENTS

| | | | | |
|---|---|---|---|---|
| 6,735,327 B1 * | 5/2004 | Shofner | ............... | G01N 21/274 382/218 |
| 8,572,799 B2 * | 11/2013 | Won | .................... | A47L 11/4002 15/352 |
| 10,235,285 B1 * | 3/2019 | Wallace | ................ | G06F 3/0652 |

(Continued)

*Primary Examiner* — Howard D Brown, Jr.
(74) *Attorney, Agent, or Firm* — WPAT, PC

(57) ABSTRACT

There is provided an optical capacity measurement device including a light source, an image sensor and a processing unit. The light source projects an optical line toward container space of a container. The image sensor captures an image containing a reflective light image associated with the optical line. The processing unit calculates a depth distribution of contents in the container space according to the reflective light image in the captured image, and integrates the depth distribution to obtain a capacity of the contents in the container space.

19 Claims, 8 Drawing Sheets

(56) References Cited

U.S. PATENT DOCUMENTS

| | | | |
|---|---|---|---|
| 2004/0262316 A1* | 12/2004 | Diep | B65F 1/06 |
| | | | 220/495.06 |
| 2006/0029382 A1 | 2/2006 | Uchida | |
| 2006/0050927 A1 | 3/2006 | Klomark et al. | |
| 2006/0284895 A1 | 12/2006 | Marcu et al. | |
| 2007/0101875 A1* | 5/2007 | Poss | F03G 6/001 |
| | | | 100/229 A |
| 2008/0143832 A1 | 6/2008 | Bramoulle | |
| 2009/0109323 A1 | 4/2009 | Muraki et al. | |
| 2009/0110322 A1 | 4/2009 | Hadap et al. | |
| 2014/0125775 A1 | 5/2014 | Holz | |
| 2014/0172174 A1* | 6/2014 | Poss | G05B 15/02 |
| | | | 700/275 |
| 2015/0181142 A1 | 6/2015 | Lin et al. | |
| 2015/0307273 A1* | 10/2015 | Lyman | B65F 1/1615 |
| | | | 705/26.61 |
| 2015/0324760 A1* | 11/2015 | Borowski | B65F 1/0006 |
| | | | 705/308 |
| 2017/0090447 A1* | 3/2017 | Skocypec | B65F 1/04 |
| 2021/0056492 A1* | 2/2021 | Zass | G06V 20/52 |
| 2023/0331472 A1* | 10/2023 | Zhu | B65F 1/16 |

\* cited by examiner

OPTICAL CAPACITY MEASUREMENT DEVICE AND CONTAINER USING THE SAME

RELATED APPLICATIONS

The present application is a continuation-in-part application of U.S. application Ser. No. 16/601,648, filed on Oct. 15, 2019, which is a continuation application of U.S. application Ser. No. 14/731,713, filed on Jun. 5, 2015, which is based on and claims priority to Taiwanese Application Number 103138317, filed Nov. 4, 2014, the disclosures of which are hereby incorporated by reference herein in their entirety.

BACKGROUND

1. Field of the Disclosure

This disclosure generally relates to a capacity measurement device and, more particularly, to an optical capacity measurement device that detects a residual capacity or a content capacity of a container with low false alarm rate and a container using the same.

2. Description of the Related Art

An optical distance measurement system may calculate an object distance using a triangulation method. For example, the optical distance measurement system includes a light source and a camera. The light source projects light to an object to be detected, and the camera receives reflected light from the object to be detected to generate an image frame. When a spatial relationship between the light source and the camera is already known, a distance of the object to be detected is obtainable using the triangulation method according to an object image position in the image frame.

In an intelligent trash can, an ultrasonic sensor is used to detect amount of garbage in the intelligent trash can. However, if there is a long object in the intelligent trash can and extending in a direction toward the ultrasonic sensor, one end of the long object is close to the ultrasonic sensor such that the ultrasonic sensor will misjudge that the garbage holding capacity of the intelligent trash can is not enough and thus a false alarm is triggered.

Accordingly, it is necessary to provide a capacity measurement device or method that can reduce the possibility of false alarm.

SUMMARY

Accordingly, the present disclosure further provides an optical distance measurement system and method that reserve information of both far and near objects in the image frame so as to improve the calculation accuracy.

The present disclosure provides an optical distance measurement system and method that utilize time-multiplexed exposure mechanism.

The present disclosure provides an optical distance measurement system and method that utilize spatial-multiplexed exposure mechanism.

The present disclosure provides a container including a light source, an image sensor and a processing unit. The light source is configured to project an optical line toward container space of the container. The image sensor is configured to capture an image containing a reflective light image associated with the optical line. The processing unit is coupled to the image sensor, and configured to calculate a depth distribution of contents in the container space according to the reflective light image in the captured image, and integrate the depth distribution to obtain a capacity when a peak of the depth distribution exceeds a depth threshold.

The present disclosure further provides a capacity measurement device configured to measure a capacity of a container. The capacity measurement device includes a light source, an image sensor and a processing unit. The light source is configured to project an optical line toward container space of the container. The image sensor is configured to capture an image containing a reflective light image associated with the optical line. The processing unit is coupled to the image sensor, and configured to detect a minimum depth of contents in the container space according to the reflective light image in the captured image, and check the capacity of the container only when the minimum depth is smaller than a depth threshold.

The present disclosure further provides a capacity measurement device including a light source, an image sensor and a processing unit. The light source is configured to project an optical line toward container space of the container. The image sensor is configured to capture an image containing a reflective light image associated with the optical line. The processing unit is coupled to the image sensor, and configured to calculate a depth distribution of contents in the container space according to the reflective light image in the image, and integrate the depth distribution to obtain a capacity.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
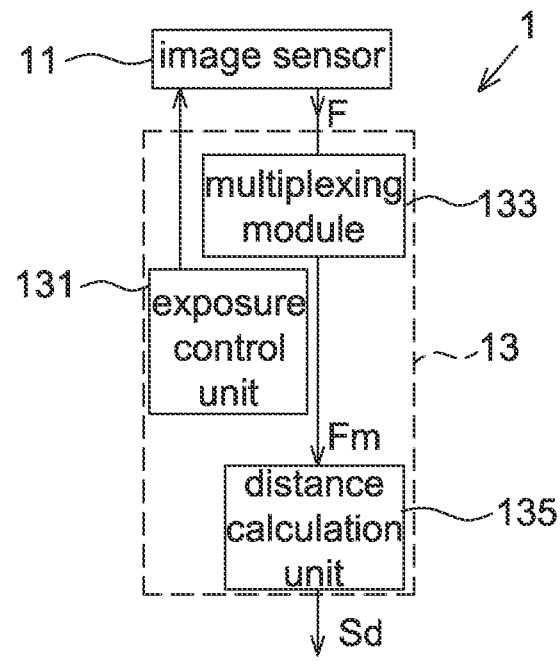
FIG. 1 is a schematic block diagram of an optical distance measurement system according to one embodiment of the present disclosure.

Referring to FIG. 1, it is a schematic block diagram of an optical distance measurement system according to one embodiment of the present disclosure. The optical distance measurement system 1 includes an image sensor 11 and a processing unit 13. The image sensor 11 is preferably an active image sensor, e.g. a CMOS image sensor, which may change an exposure time for capturing an image F or respectively capture different image regions of the image F with a plurality of exposure times (illustrated below).

The processing unit 13 is, for example, a digital signal processor (DSP), a microcontroller (MCU) or a central processing unit (CPU), and configured to receive images F outputted by the image sensor 11 to perform the post-processing and to control the image capturing of the image sensor 11. In one embodiment, the processing unit 13 includes an exposure control unit 131, a multiplexing module 133 and a distance calculation unit 135, wherein the exposure control unit 131, the multiplexing module 133 and the distance calculation unit 135 are data processors in the processing unit 13 and may be implemented by software or hardware without particular limitations. It is appreciated that although FIG. 1 shows that the processing unit 13 includes different operation modules for illustration purpose, it can be said that the functions executed by these operation modules in the processing unit 13 are executed by the processing unit 13.

The exposure control unit 131 is configured to control the image sensor 11 to capture all image regions of different images F with different exposure times (i.e. one image corresponding to one exposure time), or to capture different image regions of a same image F with a plurality of exposure times (i.e. one image corresponding to a plurality of exposure times). The multiplexing module 133 is configured to process the images F received by the processing unit 13 in a time multiplexed manner or a spatially multiplexed manner, and generate an image to be calculated Fm (e.g. the combined image or current image mentioned below). The distance calculation unit 135 is configured to calculate at least one object distance according to the image to be calculated Fm using a predetermined algorithm, e.g. calculating the object distance using the triangulation method.

Figure 2:
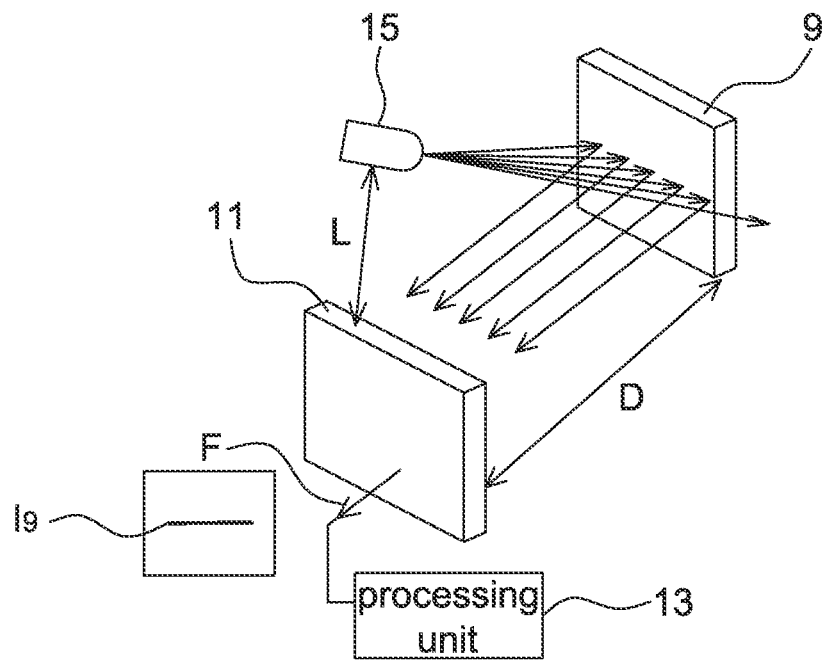
FIG. 2 is a schematic diagram of an optical distance measurement system according to one embodiment of the present disclosure.

Referring to FIG. 2, it is a schematic diagram of an optical distance measurement system according to one embodiment of the present disclosure. The optical distance measurement system 1 may further include a light source 15 configured to project a two-dimensional light section (e.g. an optical line with a predetermined width) onto an object 9, wherein the light source 15 is, for example, a coherent light source, a partially coherent light source or an incoherent light source without particular limitations. The light source 15 is configured to emit visible light or invisible light. The image sensor 11 receives reflective light from the object 9 and then generates an image F containing a reflective light image I9 to be sent to the processing unit 13. The processing unit 13 firstly uses the multiplexing mechanism (illustrated by examples below) of the present disclosure to generate an image to be calculated Fm according to the image F, and then calculates at least one object distance D according to the image to be calculated Fm, wherein the image to be calculated Fm also includes a reflective light image I9. More specifically speaking, at least a part of a plurality of exposure times corresponding to different image regions of the image to be calculated Fm are different from each other (illustrated by examples below) such that the brightness of the reflective light image I9 in each of the image regions is suitable to calculate the object distance D. In addition, in some embodiments the processing unit 13 outputs the image to be calculated Fm in a wired or wireless manner to an external device, e.g. an external host, to be post-processed. It should be mentioned that although FIG. 2 shows that the two-dimensional light section projected by the light source 15 is not a continuous section, but it is only intended to illustrate but not to limit the present disclosure.

In one embodiment, the processing unit 13 may include a storage unit (not shown) for storing a look-up table, which includes the relationship of positions of the reflective light image I9 versus object distances D. Accordingly, after the processing unit 13 obtains the position of the reflective light image I9 in the image to be calculated Fm, at least one object distance D is obtainable directly according to the look-up table, wherein the look-up table is calculated according to a spatial relationship (e.g. a distance L) between the light source 15 and the image sensor 11 and according to a projection angle of the light source 15, and the look-up table is previously stored in the storage unit. In another embodiment, the storage unit of the processing unit 13 stores a distance calculation algorithm, and after the position of the reflective light image I9 in the image to be calculated Fm is obtained, at least one object distance D is calculated according to the distance calculation algorithm.

In the embodiments of the present disclosure, as the light source 15 is configured to project a two-dimensional light section, the image F outputted by the image sensor 11 contains a linear reflective light image I9. The processing unit 13 is able to calculate a plurality of object distances at the same time (e.g. different objects corresponding to different parts of the reflective light image and at different positions) to have a better adaptability. Finally, the processing unit 13 outputs, e.g. to a host or a computer system, the calculated object distance D to perform corresponding controls, wherein the controllable function corresponding to the object distance D is determined according to different applications.

Figure 3:
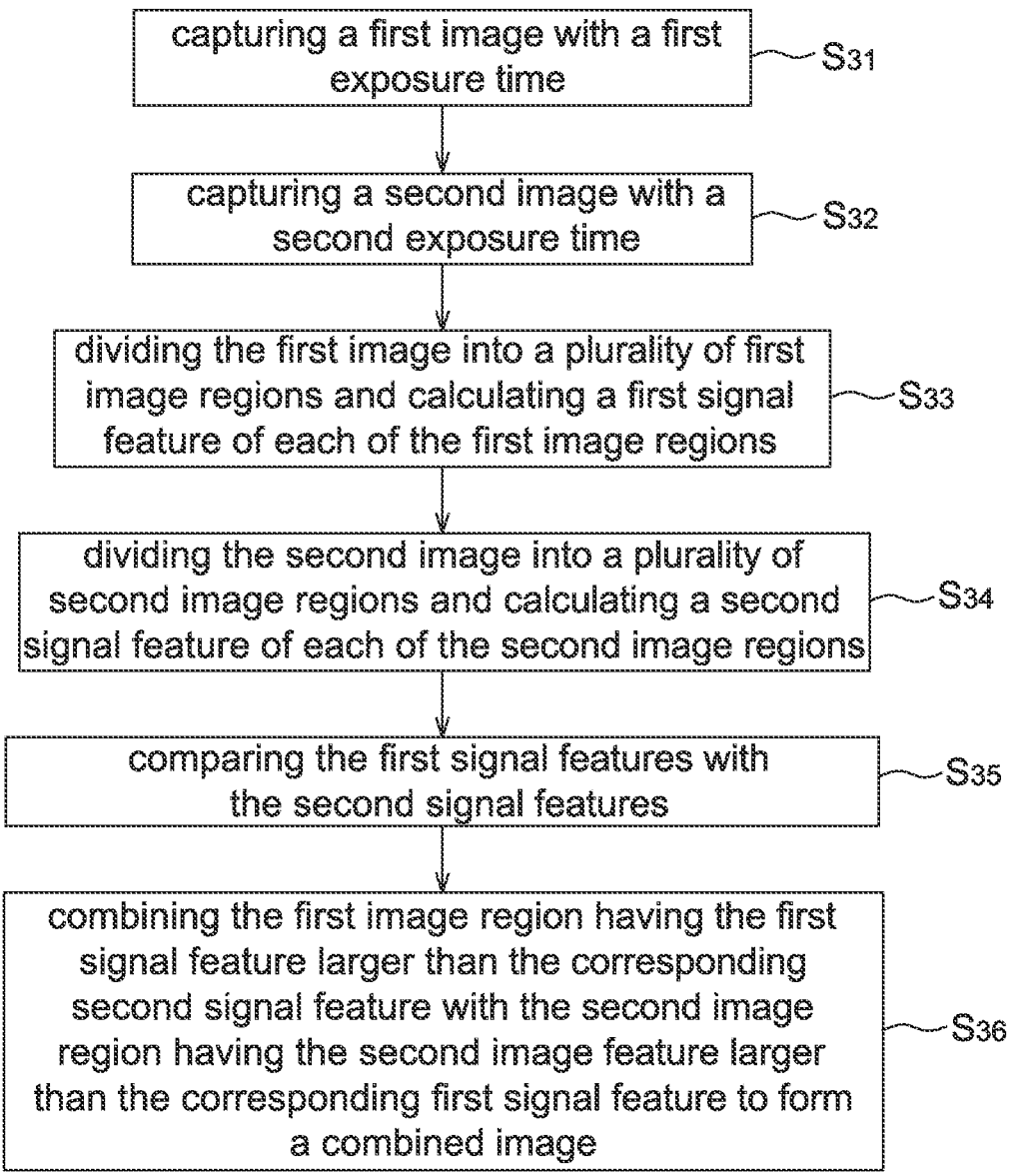
FIG. 3 is a flow chart of a distance measurement method of an optical distance measurement system according to a first embodiment of the present disclosure.

Referring to FIG. 3, it is a flow chart of a distance measurement method of an optical distance measurement system according to a first embodiment of the present disclosure, which includes the steps of: capturing a first image with a first exposure time (Step S31); capturing a second image with a second exposure time (Step S32); dividing the first image into a plurality of first image regions and calculating a first signal feature of each of the first image regions (Step S33); dividing the second image into a plurality of second image regions and calculating a second signal feature of each of the second image regions (Step S34); comparing the first signal features with the second signal features (Step S35); and combining the first image region having the first signal feature larger than the corresponding second signal feature with the second image region having the second image feature larger than the corresponding first signal feature to form a combined image (Step S36).

Referring to FIGS. 1-3 and 4A-4B together, details of the first embodiment are illustrated hereinafter. The processing unit 13 controls the light source 15 to activate when the image sensor 11 is capturing an image F such that the image F captured by the image sensor 11 contains a reflective light image I9 from the object 9 to accordingly calculate an object image D of the object 9.

Step S31: The image sensor 11 is controlled by the exposure control unit 131 of the processing unit 13 to capture a first image $F_S$ with a first exposure time $ET_S$.

Figure 4A:
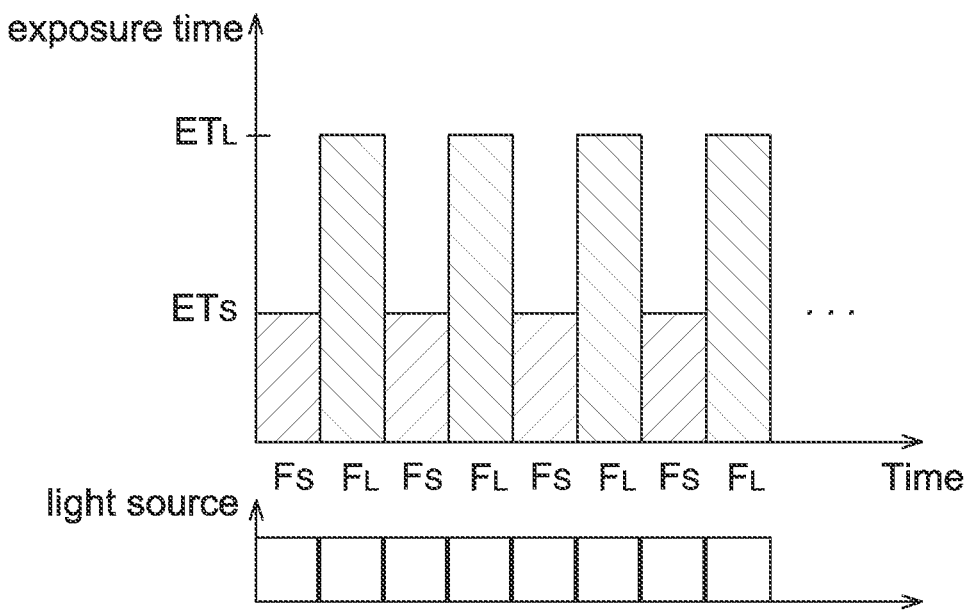
FIG. 4A is a timing diagram of the image capturing of an optical distance measurement system according to the first embodiment of the present disclosure.

Step S32: Then, the image sensor 11 is controlled by the processing unit 13 to capture a second image $F_L$ with a second exposure time $ET_L$, wherein the first image $F_S$ and the second image $F_L$ are two images F successively or separated by at least one image captured by the image sensor 11, and the first exposure time $ET_S$ is different from the second exposure time $ET_L$. It should be mentioned that although FIG. 4A shows that the first exposure time $ET_S$ is smaller than the second exposure time $ET_L$, the present disclosure is not limited thereto. In some embodiments, the first exposure time $ET_S$ is larger than the second exposure time $ET_L$. In one embodiment, the exposure control unit 131 of the processing unit 13 controls the image sensor 11 to capture images alternatively with the first exposure time $ET_S$ and the second exposure time $ET_L$.

Step S33: After the processing unit 13 receives the first image $F_S$, the multiplexing module 133 divides, in a predetermined manner, the first image $F_S$ into a plurality of first image regions, e.g. A1 to A4 (referring to FIG. 4B), and calculates a first signal feature C1 to C4 of each of the first image regions A1 to A4 (referring to FIG. 4B), wherein each of the first image regions A1 to A4 is one pixel row, a plurality of pixel rows, one pixel column, a plurality of pixel columns or a rectangular pixel region of the first image $F_S$, and is not limited to that shown in FIG. 4B. In one embodiment, the signal features C1 to C4 are signal-to-noise ratios (SNR) of the first image regions A1 to A4, respectively. For example, the multiplexing module 133 separates signal data and noise data in each of the first image regions A1 to A4 according to a dynamic threshold, and calculates a ratio of an energy sum of all signal data and an energy sum of all noise data in each of the first image regions A1 to A4 to be configured as the SNR. In one embodiment, the dynamic threshold is selected as, for example, an average value obtained by dividing a maximum energy of one first image region by a sum of average energy of all first image regions, but the present disclosure is not limited thereto. Accordingly, one threshold is obtained for each of the first image regions A1 to A4. As the threshold for each of the first image regions A1 to A4 is calculated according to the captured image data, the thresholds may be different from each other and thus the thresholds are referred to dynamic thresholds in the present disclosure.

Step S34: Similarly, after the processing unit 13 receives the second image $F_L$, the multiplexing module 133 divides, in the predetermined manner (identical to the Step S33), the second image $F_L$ into a plurality of second image regions, e.g. A1' to A4' (referring to FIG. 4B), and calculates a second signal feature C1' to C4' of each of the second image regions A1' to A4' (referring to FIG. 4B), wherein each of the second image regions A1' to A4' is one pixel row, a plurality of pixel rows, one pixel column, a plurality of pixel columns or a rectangular pixel region of the second image $F_L$, and is not limited to that shown in FIG. 4B. Similarly, the signal features C1' to C4' are signal-to-noise ratios (SNR) of the second image regions A1' to A4', respectively. For example, the multiplexing module 133 separates signal data and noise data in each of the second image regions A1' to A4' according to a dynamic threshold, and calculates a ratio of an energy sum of all signal data and an energy sum of all noise data to be configured as the SNR. The method of determining the dynamic threshold is similar to that of Step S33 and thus details thereof are not repeated herein.

Step S35: Next, the multiplexing module 133 compares the first signal feature of each of the first image regions A1 to A4 with the second signal feature of the corresponding second image regions A1' to A4'. For example, the multiplexing module 133 compares the first signal feature C1 of the first image region A1 with the second signal feature C1' of the second image region A1'; compares the first signal feature C2 of the first image region A2 with the second signal feature C2' of the second image region A2'; compares the first signal feature C3 of the first image region A3 with the second signal feature C3' of the second image region A3'; and compares the first signal feature C4 of the first image region A4 with the second signal feature C4' of the second image region A4'.

Step S36: Next, the multiplexing module 133 combines, in a time multiplexed manner, a part of image regions of the first image $F_S$ with a part of image regions of the second image $F_L$ to form a combined image Fm. In one embodiment, the multiplexing module 133 combines the first image region having the first signal feature larger than the corresponding second signal feature with the second image region having the second image feature larger than the corresponding first signal feature to form a combined image Fm. For example, it is assumed herein that the first signal features C1 and C4 are respectively larger than the second signal features C1' and C4', and this means that the first image regions A1 and A4 are more suitable to calculate a correct object distance than the second image regions A1' and A4'. Meanwhile, it is assumed herein that the first signal features C2 and C3 are respectively smaller than the second signal features C2' and C3', and this means that the second image regions A2' and A3' are more suitable to calculate a correct object distance than the first image regions A2 and A3. Then, the multiplexing module 133 forms a combined image Fm which includes image regions A1, A2', A3' and A4 as shown in FIG. 4B.

Figure 4B:
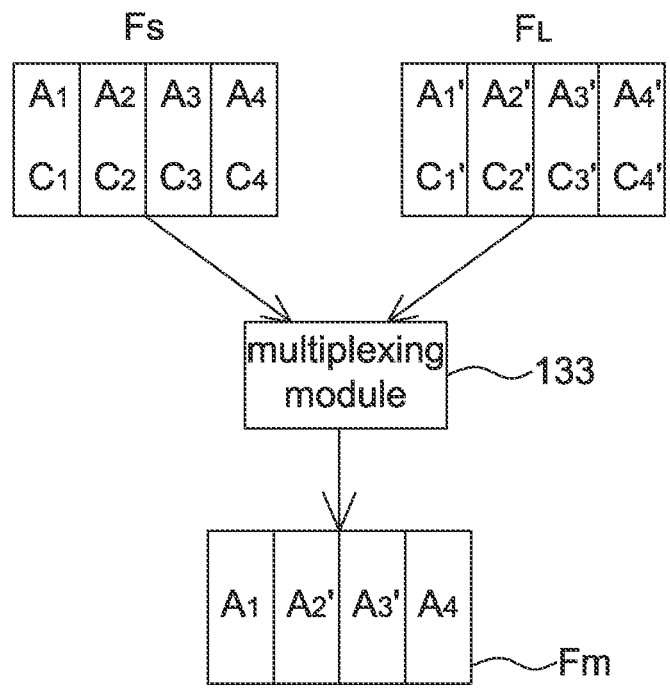
FIG. 4B is an operational schematic diagram of an optical distance measurement system according to the first embodiment of the present disclosure.

It is appreciated that although FIG. 4B shows that a combined image Fm respectively includes a part of image regions of the first image $F_S$ (e.g. A1 and A4) and a part of image regions of the second image $F_L$ (e.g. A2' and A3'), but the present disclosure is not limited thereto. According to the image F actually captured by the image sensor 11, the combined image Fm may be identical to the first image $F_S$ or the second image $F_L$.

Finally, the distance calculation unit 135 of the processing unit 13 calculates at least one object distance D according to the combined image Fm. It should be mentioned that in this embodiment a number of said at least one object distance may be determined according to a number of pixel rows of the image F. For example, one object distance is obtained corresponding to each pixel row, or one object distance is obtained corresponding to a plurality of pixel rows (e.g. 2 to 5 pixel rows) depending on the identification resolution. The distance calculation unit 135 also identifies an object number according to the plurality of object distances being obtained, and merges the object distances associated with the same object to one object distance such that the distance calculation unit 135 finally outputs a number of the object distances D identical to a number of the objects to be detected.

In addition, although FIGS. 4A and 4B show that the processing unit 13 compares the signal features of different image regions between two images F and generates a combined image Fm, but the present disclosure is not limited thereto. In some embodiments, the processing unit 13 may compare signal features of different image regions between more than two images F and generate a combined image. In this case, in the Step S36 each image region having a maximum signal feature in corresponded image regions of more than two images is selected to form the combined image Fm, and details in other Steps S31 to S35 are similar to the first embodiment and thus details thereof are not repeated herein. In other words, the multiplexing module 133 of this embodiment may divide each image F captured by the image sensor 11 into identical (e.g. identical position and size) image regions such that the combined image Fm can have a size identical to the image F.

In a word, in the above embodiment, the processing unit 13 combines different partial image regions of different image frames to form a combined image according to the image quality of the partial image regions so as to calculate at least one object distance according to the combined image, wherein shapes and sizes of the partial image regions do not have particular limitations. For example, the processing unit 13 may combine, according to the image quality (e.g. the signal feature), a part of image regions in the first image $F_S$, e.g. a part of A1 to A4, with a part of image regions in the second image $F_L$, e.g. a part of A1' to A4', to form a combined image Fm.

Figure 5:
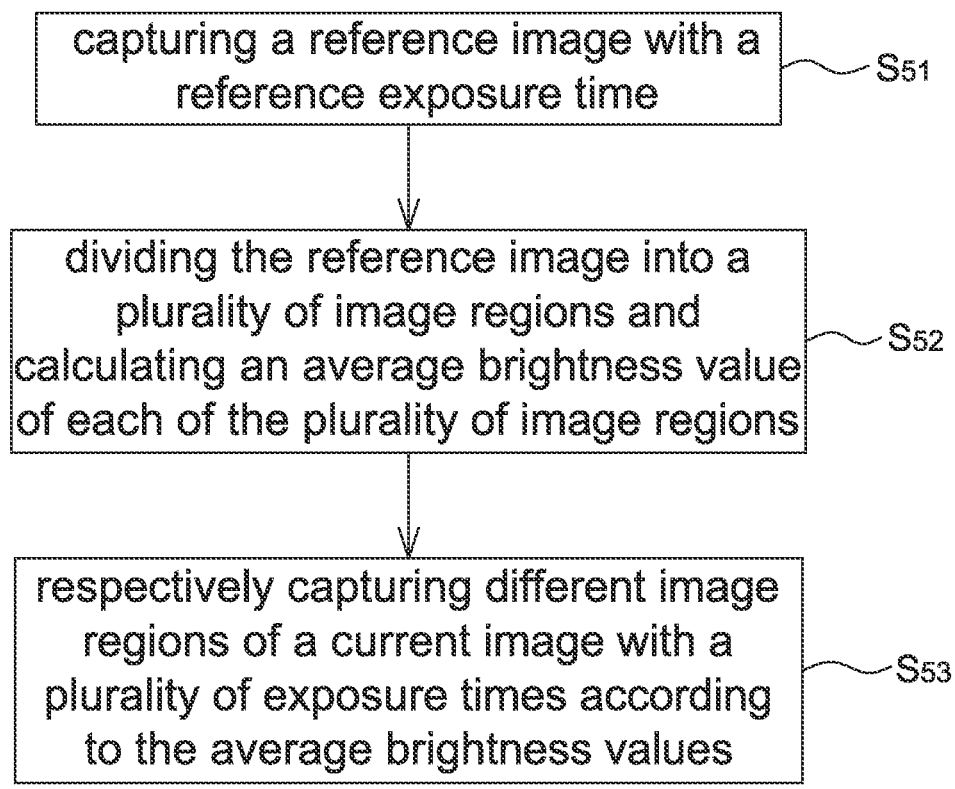
FIG. 5 is a flow chart of a distance measurement method of an optical distance measurement system according to a second embodiment of the present disclosure.

Referring to FIG. 5, it is a flow chart of a distance measurement method of an optical distance measurement system according to a second embodiment of the present disclosure, which includes the steps of: capturing a reference image with a reference exposure time (Step S51); dividing the reference image into a plurality of image regions and calculating an average brightness value of each of the plurality of image regions (Step S52); and respectively capturing different image regions of a current image with a plurality of exposure times according to the average brightness values (Step S53).

Referring to FIGS. 1-2, 5 and 6A-6B, details of the second embodiment of the present disclosure are described hereinafter. Similarly, the processing unit 13 also controls the light source 15 to emit light when the image sensor 11 is capturing images F.

Step S51: The image sensor 11 is controlled by the exposure control unit 131 of the processing unit 13 to capture a reference image $F_T$ with a reference exposure time ETr. In this embodiment, the reference image $F_T$ is configured to identify a plurality of exposure times ET for capturing a current image (e.g. $F_{T+1}$), and is not used to calculate an object distance D.

Step S52: After the processing unit 13 receives the reference image $F_T$, the multiplexing module 133 calculates, in a spatially multiplexed manner, average brightness values of a plurality of image regions in the reference image $F_T$ so as to determine a plurality of exposure times for capturing an image to be calculated Fm. For example, the multiplexing module 133 divides the reference image $F_T$ into a plurality of image regions A1 to A4 (referring to FIG. 6B), and respectively calculates average brightness values AV1 to AV4 of the image regions A1 to A4 (referring to FIG. 6B), wherein each of the different image regions A1 to A4 is one pixel row, a plurality of pixel rows, one pixel column, a plurality of pixel columns or a rectangular pixel region of the current image $F_{T+1}$, and is not limited to that shown in FIG. 6B.

Step S53: Finally, the exposure control unit 131 of the processing unit 13 controls the corresponding exposure times ET1 to ET4 (referring to FIGS. 6A to 6B) for capturing different image regions A1 to A4 of a current image $F_{T+1}$ according to the average brightness values AV1 to AV4. In one embodiment, the multiplexing module 133 of the processing unit 13 determines the plurality of exposure times ET1 to ET4 according to a comparison result of comparing the average brightness values AV1 to AV4 of the image regions A1 to A4 of the reference image $F_T$ with at least one threshold. For example, when identifying that the average brightness value AV1 is between two thresholds of a plurality of thresholds (or within one of a plurality of brightness intervals), the multiplexing module 133 directly determines, according to an exposure time (previously set and stored) corresponding to the two thresholds, the exposure time for capturing the image region A1 of the current image $F_{T+1}$ as ET1. The exposure times ET2 to ET4 corresponding to other image regions A2 to A4 are determined in the same way. In this embodiment, the current image $F_{T+1}$ is configured as the image to be calculated Fm.

Finally, the distance calculation unit 135 of the processing unit 13 calculates at least one object distance D according to the current image $F_{T+1}$.

In another embodiment, the multiplexing module 133 adjusts one exposure time step every time such that not all of the exposure times ET1 to ET4 corresponding to the image regions A1 to A4 of the current image $F_{T+1}$ are adjusted to target values according to one reference image $F_T$. In this case, when one of the brightness values of different image regions A1 to A4 of the current image $F_{T+1}$ is not within a predetermined brightness range, the exposure control unit 131 of the processing unit 13 may control a plurality of exposure times of the image sensor 11 for capturing different image regions A1' to A4' of a next image $F_{T+2}$ (referring to FIG. 6A) according to the average brightness values of the different image regions A1 to A4 of the current image $F_{T+1}$. When the multiplexing module 133 of the processing unit 13 identifies that all the brightness values of the image regions A1' to A4' of the next image $F_{T+2}$ are within a predetermined brightness range to be suitable for calculating the object distance, the distance calculation unit 135 of the processing unit 13 then calculates at least one object distance D according to the next image $F_{T+2}$. It is appreciated that the plurality of exposure times corresponding to the different image regions A1' to A4' of the next image $F_{T+2}$ may be partially identical to or totally different from the plurality of exposure times corresponding to the different image regions A1 to A4 of the current image $F_{T+1}$ depending on the average brightness values of the different image regions A1 to A4 of the current image $F_{T+1}$. When one of the average brightness values of the different image regions A1' to A4' of the next image $F_{T+2}$ is still not within a predetermined brightness range, the adjustment is continuously performed till average brightness values of all the image regions A1 to A4 are within the predetermined brightness range.

Figure 6A:
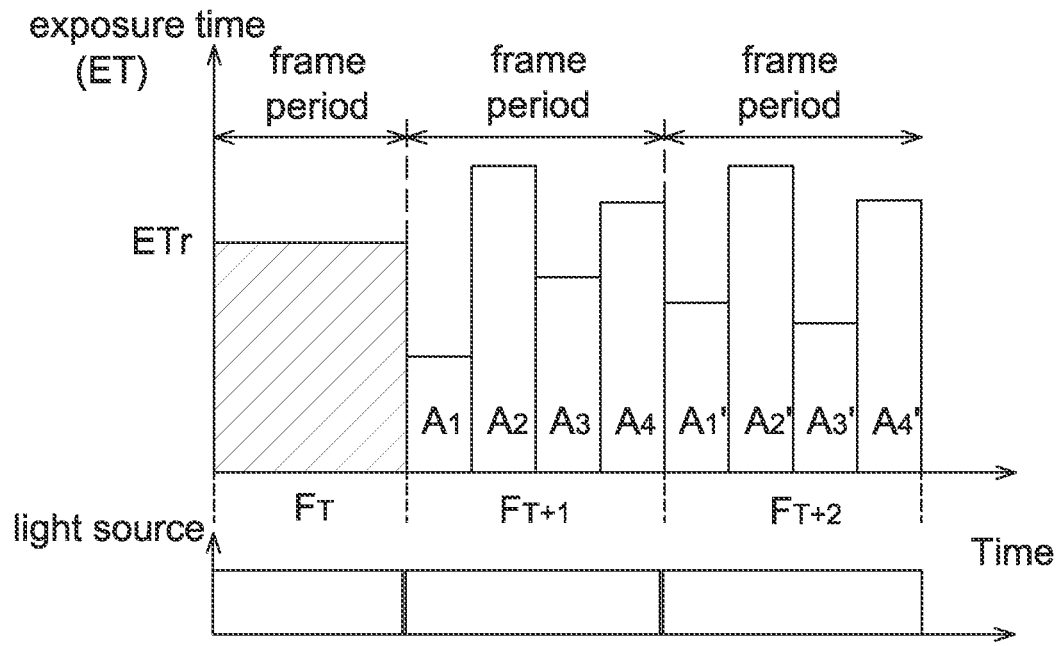
FIG. 6A is a timing diagram of the image capturing of an optical distance measurement system according to the second embodiment of the present disclosure.
Figure 6B:
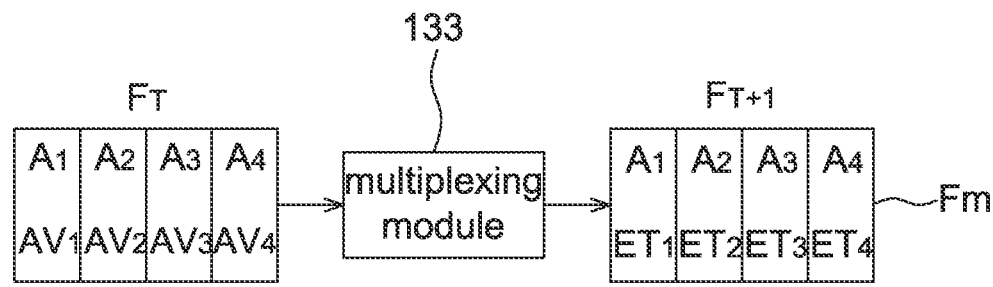
FIG. 6B is an operational schematic diagram of an optical distance measurement system according to the second embodiment of the present disclosure.

It should be mentioned that although in the Step S51 the image sensor 11 is illustrated by using one reference exposure time ETr as an example, the image sensor 11 may capture different image regions, e.g. image regions A1 to A4 shown in FIG. 6B, of the reference image $F_T$ with a plurality of identical exposure times ETr.

It should be mentioned that although in the above second embodiment the reference image $F_T$ is not used to calculate the object distance D, when average brightness values AV1 to AV4 of all the image regions A1 to A4 of the reference image $F_T$ are within a predetermined brightness range, the distance calculation unit 135 may directly calculate the object distance D according to the reference image $F_T$ without informing the exposure control unit 133 via the multiplexing module 133 to control the image sensor 11 to capture the current image $F_{T+1}$ with different exposure times ET, wherein the predetermined brightness rage may be previously set and stored in a storage unit.

Similarly, a number of the at least one object distance D is determined, for example, according to a number of pixel rows of the image F and a number of objects 9 without particular limitations.

It should be mentioned that although FIG. 6A shows that every image region A1 to A4 corresponds to different exposure times ET1 to ET4, but it is only intended to illustrate but not to limit the present disclosure. According to the image content actually being captured, only a part of the plurality of exposure times ET1 to ET4 corresponding to the different image regions A1 to A4 of the current image $F_{T+1}$ are different from each other.

In addition, in order to further eliminate the influence from ambient light, the processing unit 13 further controls the light source 15 to activate and deactivate corresponding to the image capturing of the image sensor 11, e.g. capturing a bright image corresponding to the activation of the light source 15 and capturing a dark image corresponding to the deactivation of the light source 15. The processing unit 13 further calculates a differential image between the bright image and the dark image to be configured as the first image $F_S$ and the second image $F_L$ of the first embodiment, or configured as the reference image $F_T$, the current image $F_{T+1}$ and the next image $F_{T+2}$ of the second embodiment.

In the above embodiment, the multiplexing module 133 of the processing unit 13 is configured to divide the image F and calculate signal features, e.g. the SNR or average brightness value, of different image regions so as to determine whether to output an image to be calculated Fm to the distance calculation unit 135 for calculating at least one object distance D. In the first embodiment, the exposure control unit 131 controls the image sensor 11 to capture different images (e.g. $F_S$ and $F_L$) with predetermined exposure times, and thus the exposure times that the exposure control unit 131 controls the image sensor 11 to capture different images F are fixed predetermined values (e.g. $ET_S$ and $ET_L$ in FIG. 4A). In the second embodiment, the multiplexing module 133 determines the exposure times corresponding to different image regions according to average brightness values of the different image regions and informs the exposure control unit 131, and thus the exposure times that the exposure control unit 131 controls the image sensor 11 to capture the different image regions may not be fixed predetermined values and are determined according to the actual calculation results (e.g. average brightness values).

Figure 7:
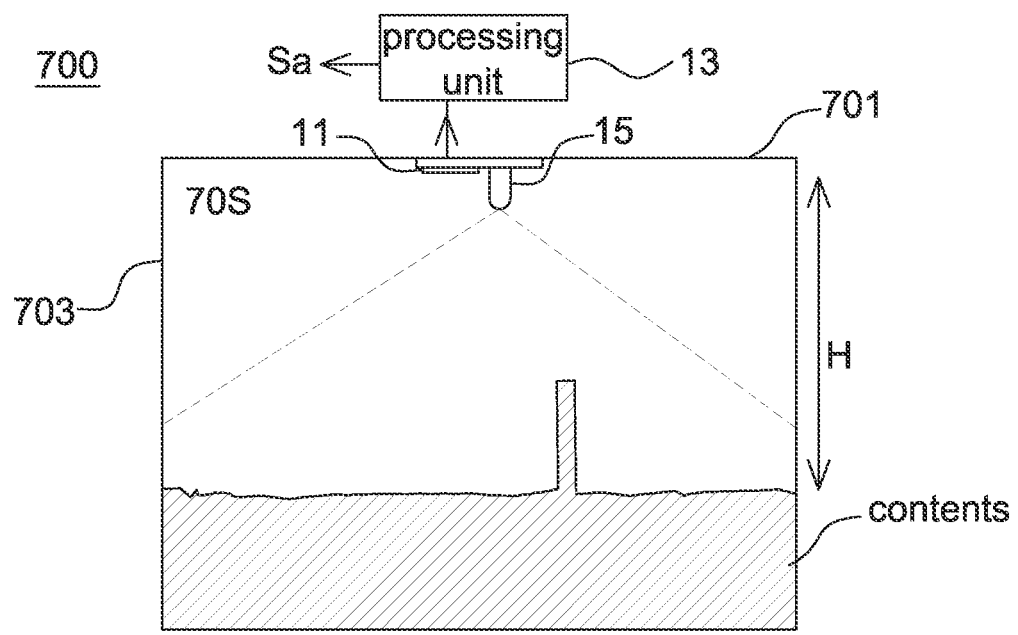
FIG. 7 is an operational schematic diagram of a capacity measurement device according to one embodiment of the present disclosure.

The present disclosure further provides a capacity measurement device and a container 700 using the same, as shown in FIG. 7. In the present disclosure, the container 700 is a trash can, a shredder, a foam maker or the like without particular limitations as long as the container 700 is used to contain and collect solid, fluid and/or semi-fluid contents. The container 700 of the present disclosure is not limited to have a top cover 701 as shown in FIG. 7.

The capacity measurement device of the present disclosure is used to detect how much of a holding capacity of the container 700 is occupied by said solid, fluid and/or semi-fluid contents. The container 700 automatically detects (e.g., at a predetermined frequency) the residual capacity or content capacity thereof, and an alarm is given when the residual capacity is lower than a predetermined threshold or the content capacity is larger than a predetermined threshold. Said predetermined threshold is determined according to different applications.

The capacity measurement device of the present disclosure is arranged on the container 700, and includes a light source 15, an image sensor 11 and a processing unit 13, which have been illustrated above as shown in FIG. 2 and thus details thereof are not repeated herein.

The light source 15 projects an optical line toward container space 70S of the container 700, referring to FIG. 2. The difference of this embodiment and FIG. 2 is that a projected direction of the optical line is toward the container space 70S, e.g., downward when the light source 15 is arranged above contents in the container space 70S as shown in FIG. 7.

The image sensor 11 receives light reflected from a bottom surface (if there is no content) or from contents in the container space 70S to capture an image (e.g., F shown in FIG. 2) containing a reflective light image (e.g., I9 shown in FIG. 2) associated with the optical line.

It is appreciated that since the optical line is a straight light section, the reflective light image is also a straight image. However, if there are contents in the container space 70S, a shape of the reflective light image is no longer a straight line (e.g., forming a broken line) since the contents generally have irregular appearances. Preferably, the light source 15 projects the optical line with an incident angle with respect to a normal line of a bottom surface of the container 700, and the image sensor 11 receives reflected light with an ejection angle with respect to the normal line of the bottom surface of the container 700.

The processing unit 13, e.g., a digital signal processor (DSP), an application specific integrated circuit (ASIC) or a field programmable gate array (FPGA), is coupled to the image sensor 11 to receive the captured image therefrom. The processing unit 13 is also coupled to the light source 15 to control the lighting of the light source 15. The processing unit 13 calculates a depth distribution 81 (e.g., referring to FIG. 8) of contents in the container space 70S according to the reflective light image in the captured image. In one aspect, the processing unit 13 calculates the depth distribution 81 based on the reflective light image using triangulation since the reflective light image is projected and received with a tilted angle.

Another method of calculating the depth in front of the image sensor 11 according to a projected optical line may be referred to the U.S. patent application Ser. No. 16/258,675, filed on Jan. 28, 2019 and assigned to the same assignee of the present application, and the full disclosure of which is incorporated herein by reference.

The processing unit 13 then integrates the depth distribution 81 to obtain a capacity that indicates the amount of contents in the container space 70S.

It is seen from FIG. 7 that a distance H from the contents to the capacity measurement device (or the image sensor 11) indicates a residual capacity of the container space 70S. If the distance H is larger (i.e. the surface of contents farther from the image sensor 11), the depth H' shown in FIG. 8 is larger; and vice versa.

Figure 8:
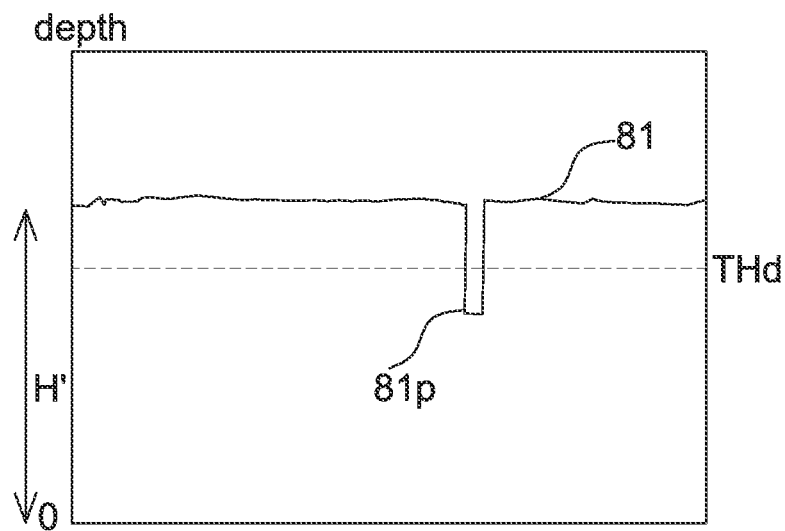
FIG. 8 is a schematic diagram of a depth distribution corresponding to contents in a container space of FIG. 7.

It should be mention that the relationship between FIGS. 7 and 8 is only intended to illustrate but not to limit the present disclosure. It is possible to show the relationship between a height of contents (e.g., subtract H from a height of the side wall 703) and the depth H'. In this case, if the height is larger, the depth H' shown in FIG. 8 is smaller; and vice versa.

Figure 9A:
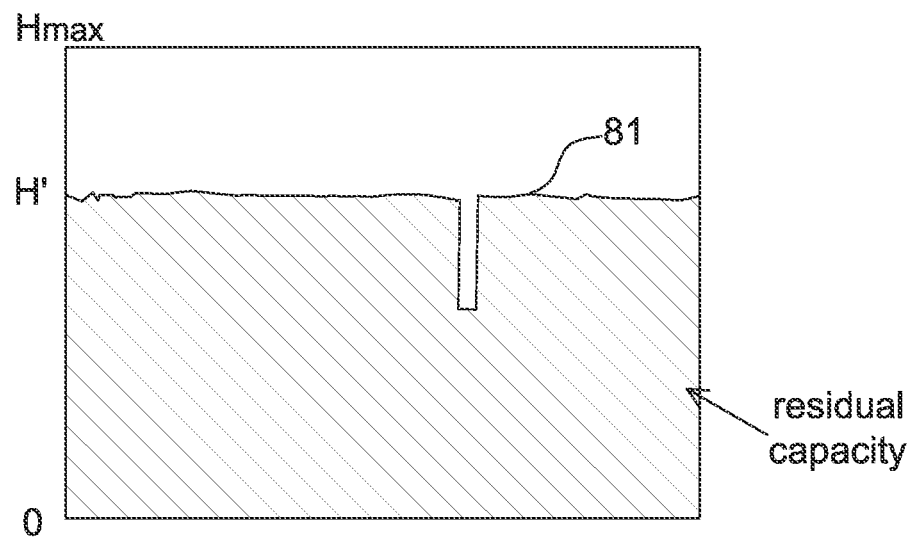
FIG. 9A is a schematic diagram of calculating a residual capacity corresponding to the depth distribution of FIG. 8.

Please refer to FIG. 9A, if the processing unit 13 integrates the space below (e.g., between 0 and H') the depth distribution 81, a residual capacity (i.e. the integration result shown as the region filled with slant lines in FIG. 9A) of the container 700 is obtained. Please refer to FIG. 9B, if the processing unit 13 integrates the space above (e.g., between H' and Hmax, which is corresponding to a height of side wall 703) the depth distribution 81, a content capacity (i.e. the integration result shown as the region filled with slant lines in FIG. 9B) of the container 700 is obtained. The processing unit 13 is arranged to calculate the residual capacity or the content capacity based on the hardware and/or firmware embedded therein.

In another aspect, the processing unit 13 is arranged to calculate average depths between H' and 0 or between H' and Hmax (i.e. the integration result shown as the region filled with slant lines) as the capacity.

To effectively reduce the false alarm rate, the capacity measurement device of the present disclosure further adds a judgment condition before generating an alarm. That is, the processing unit 13 integrates the depth distribution 81 to obtain the capacity when a peak 81P of the depth distribution 81 exceeds a depth threshold THd, indicating that the container space 70S may be full such that the capacity measurement device checks the current capacity.

For example, after the depth distribution 81 is obtained, the processing unit 13 detects a minimum depth (i.e. the peak) 81P in the depth distribution 81 calculated according to the reflective light image in the captured image. The processing unit 13 checks the current capacity of the container 700 only when the minimum depth 81P is smaller than a depth threshold THd. In one aspect, the processing unit 13 does not integrate the depth distribution 81 when the minimum depth 81P of the depth distribution 81 does not exceed (i.e. smaller herein) the depth threshold THd to save power.

Then, the processing unit 13 generates an alarm signal Sa when the calculated capacity exceeds a capacity threshold. If the processing unit 13 calculates the residual capacity, the processing unit 13 generates the alarm signal Sa when the calculated capacity is smaller than or equal to a residual capacity threshold. However, if the processing unit 13 calculates the content capacity, the processing unit 13 generates the alarm signal Sa when the calculated capacity is larger than or equal to a content capacity threshold.

In the present disclosure, the alarm signal Sa is to activate an alarm light (e.g., flickering or steady illumination), activate a speaker (e.g., broadcasting voice), activate a display (e.g., showing phrases or graphs), deactivate a function of the container or be transmitted out of the container 700. That is, the capacity measurement device of the present disclosure includes the alarm light, speaker and/or display embedded therein, or the alarm signal Sa is transmitted via a wired or wireless manner to an external alarm light, external speaker and/or external display. For example, the container 700 is arranged to, for example, cut off power, stop operation (i.e. the function of container 700) when the alarm signal Sa is generated.

The capacity measurement device of the present disclosure is to reduce the false alarm rate. Therefore, the processing unit 13 does not generate the alarm signal Sa even when the minimum depth 81p is smaller than the depth threshold THd (i.e. container 700 may be full) but the capacity does not exceed the capacity threshold (i.e. container 700 actually not full). That is, the capacity is used a double check in the present disclosure.

In another aspect, the processing unit 13 is arranged to output different flags (e.g., digital values) corresponding to different calculated capacities to perform corresponding controls, which are determined according to different applications. For example, said different flags trigger the lump to illuminate light of different colors, but not limited thereto.

Figure 10:
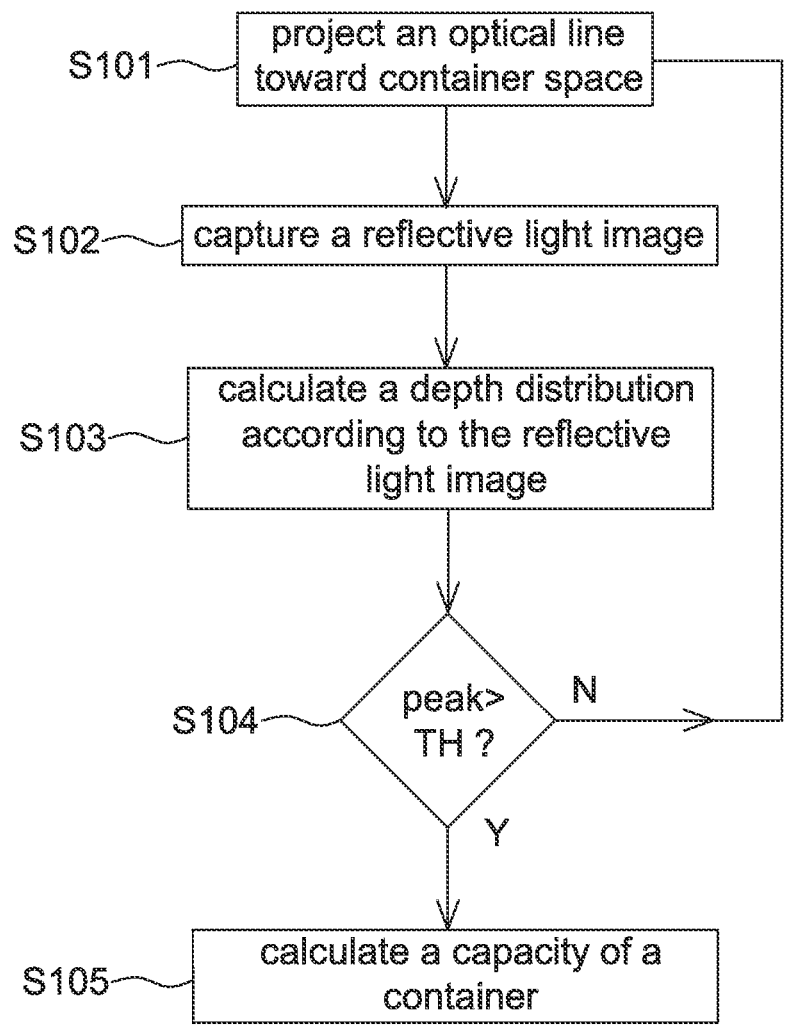
FIG. 10 is a flow chart of an operating method of a capacity measurement device according to one embodiment of the present disclosure.

Please refer to FIG. 10, it is a flow chart of an operating method of a capacity measurement device according to one embodiment of the present disclosure, including the steps of: projecting an optical line toward container space (Step S101); capturing a reflective light image (Step S102); calculating a depth distribution according to the reflective light image (Step S103); identifying whether a depth peak exceeds a predetermined threshold (Step S104); and calculating a capacity of a container when the depth peak exceeds the predetermined threshold (Step S105).

Referring to FIGS. 7 to 10 together, details of this operating method are illustrated hereinafter.

Steps S101 and S102: The light source 15 projects an optical line at a predetermined frequency, and the image sensor 11 receives, corresponding to the lighting of the light source 15, reflected light from the optical line to form a reflective light image in a captured image frame.

Step S103: The processing unit 13 receives the captured image frame from the image sensor 11, and calculates a depth distribution 81 according to the reflective light image in the captured image frame. The depth distribution 81 indicates depths of every point of contents on which the optical line is projected.

Step S104: As mentioned above, if there is a long object or elongate object in the contents, the depth distribution 81 appears a peak 81p corresponding to one end of said object. In order to reduce the false alarm rate, the processing unit 13 checks a current capacity when the peak 81p exceeds (e.g., shown as smaller in FIG. 8) a depth threshold THd.

Figure 9B:
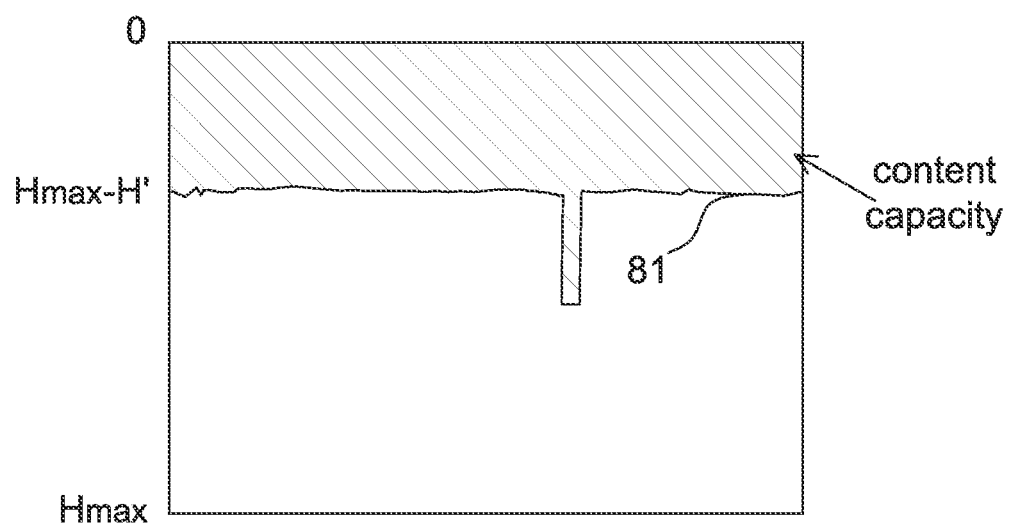
FIG. 9B is a schematic diagram of calculating a content capacity corresponding to the depth distribution of FIG. 8.

Step S105: As mentioned above, the processing unit 103 is arranged to calculate a residual capacity, as shown in FIG. 9A, or a content capacity, as shown in FIG. 9B, to confirm whether to give an alarm.

Because the capacity measurement device of the present disclosure does not directly give an alarm only according to one or several points of contents that have a relatively larger height, the false alarm rate is effectively reduced.

It should be mentioned that although the above embodiment of a capacity measurement device is described in the way that the light source 15 projects one light section on the contents, the present disclosure is not limited thereto. In other aspects, the light source 15 projects multiple light sections (e.g., with equal pitch) or projects one light section which scans back and forth in a direction perpendicular to an extending direction of the light section so as to broaden the detection range and further reduce the false alarm rate.

It should be mentioned that although the above embodiment of a capacity measurement device is described in the way that the capacity measurement device (e.g., including light source 15 and the image sensor 11) are both arranged above contents in the container space 70S (e.g., at a top cover 701), the present disclosure is not limited thereto. In another aspect, the light source 15 and the image sensor 11 are both arranged at a side wall 703 of the container 700. In an alternative aspect, the light source 15 is arranged at a side wall 703 of the container 700 but the image sensor 11 is arranged above the container space 70S, i.e. at the top cover 701.

As mentioned above, the conventional optical distance measurement system has the problem of unable to accurately measure objects at different positions. Especially an object at a far distance may not be measured. Therefore, the present disclosure further provides an optical distance measurement system (FIGS. 1 and 2) and an optical distance measurement method (FIGS. 3 and 5) that reserve image information of objects to be detected at different distances through time multiplexed manner or spatially multiplexed manner so as to improve the calculation accuracy.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A container, comprising:
a light source, configured to project an optical line toward container space of the container, wherein the optical line is a linear light section having a length longer than a width thereof;
an image sensor, configured to capture an image containing a reflective light image associated with the optical line; and
a processing unit, coupled to the image sensor, and configured to
calculate a depth distribution of contents in the container space according to the reflective light image in the captured image, and
integrate the depth distribution to obtain a capacity when a peak of the depth distribution exceeds a depth threshold.

2. The container as claimed in claim 1, wherein the capacity is a content capacity or a residual capacity of the container.

3. The container as claimed in claim 1, wherein the processing unit is further configured to generate an alarm signal when the capacity exceeds a capacity threshold.

4. The container as claimed in claim 3, wherein the alarm signal is configured to activate an alarm light, activate a speaker, activate a display, deactivate a function of the container or be transmitted out of the container.

5. The container as claimed in claim 3, wherein the processing unit is configured
not to integrate the depth distribution when the peak of the depth distribution does not exceed the depth threshold, and
not to generate the alarm signal when the peak of the depth distribution exceeds the depth threshold but the capacity does not exceed the capacity threshold.

6. The container as claimed in claim 1, further comprising a top cover, wherein the light source and the image sensor are arranged at the top cover.

7. The container as claimed in claim 1, wherein
the container is a trash can, a shredder or a foam maker, and
upon the contents in the container space, the reflective light image forms a broken line.

8. A capacity measurement device, configured to measure a capacity of a container, the capacity measurement device comprising:
a light source, configured to project an optical line toward container space of the container;
an image sensor, configured to capture an image containing a reflective light image associated with the optical line; and
a processing unit, coupled to the image sensor, and configured to
detect a minimum depth of contents in the container space according to the reflective light image in the captured image, and
check the capacity of the container only when the minimum depth is smaller than a depth threshold,
wherein the processing unit is configured to
calculate a depth distribution of the contents in the container space according to the reflective light image in the captured image, and
integrate the depth distribution or average depths of the depth distribution as the capacity.

9. The capacity measurement device as claimed in claim 8, wherein the capacity is a content capacity or a residual capacity of the container.

10. The capacity measurement device as claimed in claim 8, wherein the processing unit is further configured to generate an alarm signal when the capacity exceeds a capacity threshold.

11. The capacity measurement device as claimed in claim 10, wherein the alarm signal is configured to activate an alarm light, activate a speaker, activate a display, deactivate a function of the container or be transmitted out of the container.

12. The capacity measurement device as claimed in claim 10, wherein the processing unit is configured not to generate the alarm signal when the minimum depth is smaller than the depth threshold but the capacity does not exceed the capacity threshold.

13. The capacity measurement device as claimed in claim 8, wherein the capacity measurement device is arranged above the container space.

14. A capacity measurement device, comprising:
a light source, configured to project an optical line toward container space of the container, wherein the optical line is a linear light section having a length longer than a width thereof;
an image sensor, configured to capture an image containing a reflective light image associated with the optical line; and
a processing unit, coupled to the image sensor, and configured to
calculate a depth distribution of contents in the container space according to the reflective light image in the image, and
integrate the depth distribution to obtain a capacity.

15. The capacity measurement device as claimed in claim 14, wherein
the capacity is a content capacity or a residual capacity of the container, and
upon the contents in the container space, the reflective light image forms a broken line.

16. The capacity measurement device as claimed in claim 14, wherein the processing unit is further configured to generate an alarm signal when the capacity exceeds a capacity threshold.

17. The capacity measurement device as claimed in claim 16, wherein the alarm signal is configured to activate an alarm light, activate a speaker, activate a display, deactivate a function of the container or be transmitted out of the container.

18. The capacity measurement device as claimed in claim 14, wherein the processing unit is configured to output different flags corresponding to different capacities.

19. The capacity measurement device as claimed in claim 14, wherein the processing unit is configured to integrate the depth distribution when a peak of the depth distribution exceeds a depth threshold.

* * * * *